(12) United States Patent
Peake et al.

(10) Patent No.: US 7,558,354 B2
(45) Date of Patent: Jul. 7, 2009

(54) PILOT SYMBOLS IN COMMUNICATION SYSTEMS

(75) Inventors: Michael Robert Peake, Mawson Lakes (AU); Mark Rice, Kensington Park (AU)

(73) Assignee: DSpace Pty., Ltd., Mawson Lakes (AU)

( * ) Notice: Subject to any disclaimer, the term of this patent is extended or adjusted under 35 U.S.C. 154(b) by 659 days.

(21) Appl. No.: 10/522,566

(22) PCT Filed: Nov. 7, 2003

(86) PCT No.: PCT/AU03/01484

§ 371 (c)(1),
(2), (4) Date: Jan. 28, 2005

(87) PCT Pub. No.: WO2004/042949

PCT Pub. Date: May 21, 2004

(65) Prior Publication Data
US 2006/0165128 A1 Jul. 27, 2006

(30) Foreign Application Priority Data
Nov. 7, 2002 (AU) .............................. 2002952566

(51) Int. Cl.
*H04L 7/00* (2006.01)
(52) U.S. Cl. ........................ 375/363; 375/260; 375/354; 375/364; 375/368
(58) Field of Classification Search ................. 375/260, 375/354, 284, 259, 262
See application file for complete search history.

(56) References Cited

U.S. PATENT DOCUMENTS

| 5,712,877 A | 1/1998 | Ho et al. |
| 2002/0031189 A1 | 3/2002 | Hiben et al. |
| 2002/0136176 A1 | 9/2002 | Abeta et al. |

FOREIGN PATENT DOCUMENTS

WO WO 98/44644 10/1998

OTHER PUBLICATIONS

U.S. Appl. No. 11/913,871 (Claims); pp. 3-6. Nov. 8, 2007.*
Fractal based Channel Estimation for WCDMA Systems; Zhu, S. et al.; IEEE 2004; pp. 880-884.*
Blind Fractal Signal Estimation for SCDMA Systems Over Multipath Fading Channels; Zhu, S. et al.; IEEE 2000; pp. 359-362.*
Fractal; Wikipedia; Feb. 8, 2008; pp. 1-7.*
H. Lo et al.; "A Study of Non-Uniform Pilot Spacing for PSAM"; Department of Electrical and Computer Engineering; 2000 IEEE; (pp. 322-325).

* cited by examiner

*Primary Examiner*—Sudhanshu C Pathak (57) ABSTRACT

This invention relates to signal processing in telecommunications, particularly but not exclusively for use in wireless TDMA systems. In particular, the invention concerns methods for use in communication systems making use of pilot symbols. The invention provides a method of placing pilot symbols in a data stream for telecommunication systems, wherein the pilot symbols are spaced in time using a range of different intervals between symbols. The intervals between the pilot symbols are substantially fractal in nature, the distribution of pilot symbols involving repetitions of irregular groupings of pilot symbols in the data stream. Preferably, the irregular groupings of pilot symbols are irregularly spaced in the data stream. The invention also provides a method and means for acquiring the time and frequency offset of a packet of data by using pilot symbols distributed within the packet as defined above.

15 Claims, 6 Drawing Sheets

PILOT SYMBOLS IN COMMUNICATION SYSTEMS

RELATED APPLICATIONS

The present application is a U.S. National Phase Application of International Application PCT/AU2003/001484 (filed Nov. 7, 2003) which claims the benefit of Australian Patent Application No. 2002952566 (filed Nov. 7, 2002), all of which are herein incorporated by reference in their entirety for all purposes.

FIELD OF THE INVENTION

This invention relates to signal processing in telecommunications, particularly but not exclusively for use in wireless TDMA systems. In particular, the invention concerns methods for use in communication systems making use of pilot symbols.

BACKGROUND TO THE INVENTION

Pilot symbol assisted modulation (PSAM) is a known method used to reduce effects of fading and other distortion factors in mobile communications, by periodically inserting known pilot symbols in the signal data stream. Since the transmitted pilot symbols are known, the receiver can make use of these regularly spaced pilot symbols to derive the amplitude and phase reference of the received signal. Channel estimators are used to determine the amplitude and phase reference at the known pilot symbols, providing correction factors that can then be interpolated and applied to the other symbols (data symbols) in the signal. There is, in general, a tradeoff between the complexity of the acquisition algorithm and its robustness. Two types of algorithms used for frequency acquisition are differential decoding and coherent correlation (see below).

The robustness of frequency estimation for a data packet in noise depends on the pattern of pilot symbols throughout the packet. The most robust methods use the Fourier Transform. In this method, the data symbols are identified and removed, leaving the pilot symbols. A Fourier Transform (typically, the Fast Fourier Transform—FFT) is then applied to the resulting packet in order to identify the maximum-likelihood frequency.

Pilot symbols do not carry any data, and it is therefore necessary to keep them to as few as possible. However, too few pilot symbols can result in performance degradation due to poor channel estimation. The trade-off between pilot symbol spacing and the symbol error rate is therefore an important consideration for system of this type.

The dominant method of TDMA packet acquisition uses contiguous blocks of pilot symbols, known as Unique Words (UW) often coded with binary phase shift keying (BPSK) to allow identification of the packet's time offset. Fast algorithms have been developed for UW packet acquisition.

If a single UW is used alone, the frequency acquisition is poor. Methods have therefore been developed to spread pilot symbols over the length of the packet. Two methods are commonly used to improve frequency offset estimation in such packet acquisition:

1. Pilot symbols regularly spaced throughout the packet. Once the contiguous block of UWs has been used to establish the packet's timing, the channel can be sampled at regular intervals and the pilot symbols throughout the packet may be used to identify the frequency to an acceptable resolution. This divides the UW into two parts, each used for different tasks, which is not computationally efficient. Ideally, all pilot symbols should be used for both time and frequency acquisition.
2. Two UWs, one placed at either end of the packet. The phase between the leading and trailing pilot symbol UWs gives a precise frequency estimate. However, such methods can tend to distinguish poorly between certain frequency alternatives, as no pilot symbol data is available throughout the bulk of the packet.

Coherent correlation methods are comparatively fast. In such techniques, the majority of the pilot symbols are in a UW at the front of the packet. A frequency offset is applied to the UW symbols before they are summed. However, if the frequency offset is not close to the signal's actual frequency, symbols in the UW can cancel one another, and the SNR will thus be significantly decreased. To overcome this, coherent correlation must be repeated at a number of different frequency offsets, such that at least one frequency option is sufficiently close to the actual frequency. This repetition increases the complexity, and the technique is less robust than the Fourier Transform frequency response method described above.

Differential decoding methods are also comparatively fast, and they need not deal with coherence issues. However, they decrease the effective SNR by multiplying noise data symbols together. To overcome this, differential decoding must be repeated at several different time-offsets, which once again increases the algorithm complexity. The technique cannot improve on a performance dictated by the pattern of pilot symbols.

Methods have been proposed in the past for pilot structures relying on non-uniform spacing, such as that postulated in '*A study of Non-Uniform Pilot Spacing for PSAM*', Lo, H., Lee, D. and Gansman, J. A., IEEE 2000, *Proc ICC International Conference on Communications, Volume* 1, 18-22 Jun. 2000, pp. 322-325. This paper examines a number of alternative structures, and concludes that performance can theoretically be improved without increasing the number of pilot symbols by using non-uniform distributions, especially at high Doppler rates and in the presence of an unknown frequency offset. However, the paper does not consider optimisation, and the non-uniform structures considered are in fact repeating regular patterns.

There is scope to improve the robustness of frequency acquisition by improved selection of the pattern of pilot symbols.

SUMMARY OF THE INVENTION

It is an object of the invention to at least partially address the inconveniences of the prior art, and to provide a useful alternative to existing communications systems involving pilot symbols, particularly in low signal-to-noise ratio conditions.

To this end, the invention provides in accordance with a first aspect a method of placing pilot symbols in a data stream for telecommunication systems, wherein the pilot symbols are spaced in time using a range of different intervals between symbols.

The distribution of pilot symbols in time is substantially fractal in nature, preferably involving repetitions of irregular groupings of pilot symbols in the data stream, with said irregular groupings of pilot symbols themselves irregularly spaced in the data stream.

In fundamental form of the pilot symbol distribution within a data packet, the pilot symbols are placed with irregular spacing within a first level group (L0 level), the irregular spacing is repeated in a plurality of such L0 groups, and the L0 groups are placed with irregular spacing within a second level group (L1 level). In a preferred form, the irregular spacing between the L0 groups is repeated in a plurality of L1 groups across the data packet, and the L1 groups are placed with irregular spacing within a third level group (L2 level).

Ideally, if each L0 groups has length A, each L1 group each has length B, and the L2 group has length C, the pilot symbol distribution is selected such that the ratio A:B is approximately equal to the ratio B:C.

For best performance, the pilot symbols extend across substantially the entirety of the data packet.

The spacing of the pilot symbols is decided in accordance with a mathematical relationship, such that their positions are substantially predictable, but sufficiently unevenly spaced to improve the ratio of the pilot symbol spectrum corresponding to the most likely frequency to that of the next most likely frequency, when compared with that available from an equivalent data stream containing evenly spaced pilot symbols.

In accordance with a further aspect, the invention provides a signal processing device for use in a communications system for generating a data stream for telecommunication systems, the signal processing device configured to implement the above defined method.

A fractal is a mathematical pattern that has significant structure on several different length scales. Fractal patterns occur frequently in nature, of course, common examples being a coastline having gulfs, bays, inlets, boulders, pebbles and sand grains on different length scales, or a tree having boughs, branches and twigs on different length scales. In a fractal structure, there is new detail at each new length scale. On the other hand, a square has four corners, with simple straight lines between those corners. There is no new detail in a square that is smaller than the square itself.

The pilot symbol pattern of the invention is thus built from sub-patterns that are repeated at irregular intervals, these sub-patterns themselves built up from smaller sub-patterns. This multi-scale structure allows a multi-scale approach to frequency estimation, as each scale (or level) of the pilot symbol pattern is used to find a frequency estimate. The multi-scale algorithm uses each frequency estimate to resolve potential aliasing errors in the next frequency estimate, until the most precise frequency estimate's aliasing has been resolved. The multi-scale algorithm is computationally efficient because is needs only find frequency estimates for a few simple patterns.

The invention thus provides a new class of pilot symbol patterns that allow efficient acquisition of the data packet's time and frequency, as well as a novel algorithm for acquisition of the time and frequency offset. The pilot symbol pattern is particularly robust to phase noise, as the pilot symbols, though irregular, are placed with a uniform density throughout the packet. Importantly, the pilot symbol pattern allows the spectrum of the pilot symbols to be narrower than that of the packet, thus reducing adjacent channel interference during acquisition.

In accordance with the invention, different pilot symbol patterns can be selected for different users, with low cross-correlation.

The method of the invention is computationally efficient when compared to data streams containing randomly placed pilot symbols. As the pilot symbol intervals have a mathematical relationship with each other they are sufficiently predictable to ensure that the computational power needed is significantly less than that required for randomly distributed pilot symbol schemes, yet sufficiently unevenly spaced to perform their intended function of substantially improving the signal to noise ratio.

This type of spacing of pilot symbols is therefore fractal in nature, as it is specifically formulated to afford pilot symbol analysis on a plurality of different length scales over the packet. In a preferred embodiment, the packet structure includes small groups of pilot symbols, a plurality of these small groups grouped into a medium-level group, and a plurality of these medium-level groups grouped into a high-level group. At each level, then, there is a specific group structure. There is preferably no mathematical repetition of the group structure from one group level (length scale) to the next. In a preferred embodiment, the pilot symbols are spread in this pattern over the entirety, or almost the entirety, of the signal packet.

In accordance with a further aspect of the invention, there is provided a means of acquiring the time offset and frequency of a packet of data by using pilot symbols distributed within the packet as described above.

In one embodiment, a receiver method for receiving and acquiring a transmitted signal in a communications system is provided, the signal representing a data stream including data symbols and pilot symbols, the method including the steps of:

receiving the transmitted signal and converting to a digital signal;

iteratively acquiring the frequency of the signal by the following steps:

based on an assumed zero phase difference between certain relatively closely spaced pilot symbols within the data stream, calculating a first estimate of phase and signal amplitude;

calculating a relatively fine frequency estimate with potential aliasing ambiguity, based on more widely spaced pilot symbols within the data stream;

using said relatively fine frequency estimate to calculate a phase difference between said relatively closely spaced pilot symbols, and calculating a relatively coarse frequency estimate based on this phase difference, with no aliasing ambiguity;

using the calculated relatively coarse frequency estimate to enhance the relatively fine frequency estimate by refining said calculated phase and signal amplitude, and thus re-calculating said relatively fine frequency estimate;

using said relatively coarse frequency estimate and the enhanced relatively fine frequency estimate to resolve potential aliasing ambiguity in the relatively fine frequency estimate; and applying the enhanced relatively fine frequency estimate to the data stream in the acquisition of the data symbols.

In another embodiment, a receiver method for receiving and acquiring a transmitted signal in a communications system is provided, the signal representing a data stream including data symbols and pilot symbols, the method including the steps of:

receiving the transmitted signal and converting to a digital signal;

acquiring the frequency of the signal by the following steps:

a) a medium frequency estimation step;

b) a coarse frequency estimation step based on the result of step (a);

c) a medium frequency re-estimation step based on the result of step (b);

d) an adjustment to the medium frequency estimation to resolve potential aliasing ambiguities in the medium frequency estimation;

e) a fine frequency estimation step, including a calculation of a likelihood for the selected frequency; and
f) an adjustment to the fine frequency estimation to resolve potential aliasing ambiguities in the fine frequency estimation.

In a preferred form, a further step is included, of:
g) a phase and signal estimation and correction step based on the result of step (f).

In a preferred form, a further step is included, of:
h) the removal of the pilot symbol from the data stream to provide a data symbol output.

The receiver method may include a process for further improving the reliability of acquisition by using additional encoded pilot symbols embedded within the data stream, the additional pilot symbols encoded with forward error correcting codes; the process including the steps in the receiver of:
i) acquiring a list of the most probable time and frequency offset pairs ranked in order of probability;
ii) for each said time and frequency offset pair in the list, starting with that with the highest probability, and proceeding in order of decreasing probability:
 decoding the packet on the basis of that time and frequency offset;
 if a predetermined number of said additional encoded pilot symbols match their prescribed values, accepting that time and frequency offset;
 if not, continuing to the next time and frequency offset pair in the list.

In a preferred form, the invention involves applying the above defined receiver method to a transmitted signal produced by the above defined pilot symbol placing method.

For greater data transmission efficiency, the receiver method may be enhanced by selecting in the data stream one or more of the pilot symbols and replacing them with data symbols, and applying the acquisition steps based on the assumption that these selected symbols are pilot symbols with zero value.

In accordance with a further aspect of the invention, a receiver for receiving and acquiring transmitted signals in a communications system is provided, the signals representing a data stream including data symbols and pilot symbols, the receiver including functional blocks for carrying out the steps of the above defined receiver method.

The method of the invention therefore uses an iterative process towards coherent signal acquisition, combining frequency estimates based on an a priori assumption of coherence between pilot symbols in the smallest subgroup, with frequency estimates based on an a priori assumption that pilot symbols in different subgroups are independent in phase. The method thus calculates phase differences between the smallest subgroups, which may include aliasing ambiguities ($2\pi$ ambiguities). This phase difference can then be used to recalculate the offset between pilot symbols in the smallest group, allowing the resolution of any aliasing ambiguities.

In a preferred three-level process, the coarsest frequency estimate is used to resolve aliasing ambiguities in an intermediate frequency estimate, and the intermediate frequency estimate is used in turn to resolve aliasing ambiguities in the finest frequency estimate. As a result, the pilot symbols can be summed coherently to find the correct frequency.

The method of the invention thus relies upon the estimation of just a small number of phase differences, one phase difference corresponding to each layer of the multi-scale (fractal) pattern of pilot symbols.

It is to be noted that the prior art uses both UWs and pilot symbols to determine and achieve the functions of signal acquisition (which requires coarse timing estimates), and determination of the correct frequency. In contrast, the invention preferably uses pilot symbols alone to perform both these functions, substantially all pilot symbols being used to acquire both timing and frequency. The invention lends itself to a system capable of performing both functions using pilot symbols alone, rather than depending on contiguous blocks of consecutive symbols making up the UWs. In particular, the timing acquisition function is effectively distributed through the non-equispaced pilot symbols.

The invention provides pilot symbol patterns shown to have better sidelobe suppression than those of the prior art, to which a computationaly efficient acquisition algorithm can be applied. The relatively regular structure of the pilot symbol pattern of the invention allows a rapid calculation of the data packet's most likely frequency, while the irregular intervals assist in reducing the sidelobes.

The present invention is demonstrated to have superior packet error rate performance, using less 'overhead' data, thus improving the effective throughput data rate. A reduction in the signal to noise ratio allows lower signal power or greater symbol rate, whilst the use of a larger bandwidth allows more effective pre-processing of the incoming data.

The present invention therefore provides improved reliability of acquisition of a data packet in the presence of noise, fading factors, or other deleterious effects. In comparison with prior art approaches it involves a smaller cost in pilot symbols and/or improved acquisition over a broader bandwidth. The invention can be applied to sub-carrier based modulation systems (OFDM) and TDMA systems, for example. In addition, it can be applied to block-based estimators for short-packet data streams and sliding-window estimators for long-packet or continuous transmission data streams.

BRIEF DESCRIPTION OF THE DRAWINGS

A more complete understanding of the invention may be obtained from a consideration of the following detailed description of a preferred embodiment, in conjunction with the accompanying drawings, in which.

DETAILED DESCRIPTION

The communications system of this embodiment of the invention involves a source TDMA signal including pilot symbols in the stream of data symbols, which is passed through a communications interface and received at a receiver. The received signal is processed to separate the pilot symbols from the data symbols. Ideally, the time and frequency of the pilot symbols are known to the receiver (as are the pilot symbols themselves), so that channel estimation can be carried out on the data symbols. The problem is that phase noise rotates the received symbols by an amount that can vary, and it is thus necessary to calculate a phase error correction value in order that phase error can be suppressed. The conventional technique is to select a set of postulates defining possible frequency errors, to generate a set of error-compensated pilot symbols by each of said postulates, to generate a metric giving the likelihood of the frequency error being correct, and thus to select the frequency in accordance with this metric. Additionally, it is necessary to correct the time alignment in the signal.

The general concept of pilot symbols and data symbols is known to the person skilled in the art and will not be described in further detail here.

The acquisition routine must find the frequency and time that a packet is received. The Unique Word method (UW) transmits a known data stream to assist with the task.

In the presence of noise, the frequency cannot be found perfectly. An uncertainty principle known as the Cramer Rao Lower Bound (CRB) limits the precision of the frequency determination. A short UW at the head of a transmission is not sufficiently precise, as phase drift over time—caused by frequency errors—can cause loss of information.

One known approach is to have two UWs, one at the front and one at the end of the packet. Each UW gives a coarse frequency estimate, whilst the phase difference between the two provides a fine resolution. Although this method provides a level of improvement, it is not always sufficiently accurate. The phase difference is ambiguous by multiples of $2\pi$ radians, leading to corresponding uncertainty in the fine frequency offset resolution. Further improvement can be obtained—at cost of additional computation—by developing a list of possible frequency offsets, and trying each one in turn (a method known as 'TurboSynch').

If information were available midway through the packet, a phase difference of $2\pi$ between the UWs would be evident, since the intermediate pilot symbol would be incorrect by $\pi$ radians. It would require a larger frequency offset—with $4\pi$ radians between UWs—before similar ambiguities were encountered.

A disadvantage of using only two UWs is that no information is available to distinguish between frequency offset possibilities. Instead, as the present invention appreciates, a structure is required with information on multiple length-scales. The invention provides such a structure, involving a UW based on a fractal.

Essentially, and as explained above, a fractal is a mathematical pattern that has significant structure on a plurality of different length scales. An example of a mathematical fractal is the Cantor set, formed by starting with the number line between 0 and 1, removing the middle third, leaving a segment at either end, removing the middle third of each segment, leaving four (irregularly spaced) segments, and then continuing to remove the middle third of each segment. The resulting pattern is thus made up of four clumps of entries, each clump built up of four smaller clumps, and so on.

Clearly, the set of symbols in a TDMA packet is finite, so the pattern is not a true fractal. The structures described below have patterns on at least three length scales, but the skilled reader will appreciate that a distribution having two or more length scales two is embraced by the present invention.

In accordance with fractal geometry, a fractal cannot be treated as existing strictly in one, two, or any other whole-number dimensions. Instead, it must be handled mathematically as though it has some fractional dimension.

The UWs of the prior art are formed from contiguous blocks of pilot symbols. The groupings in accordance with the invention and described below have pilot symbols placed irregularly throughout the packet. This pattern has information on all length-scales, so it can resolve ambiguities, but the pattern repeats sufficiently regularly to deal with noise in a methodical way. Additionally, by using pilot symbols throughout the packet, fading can be more reliably tracked than hitherto possible.

The pattern of pilot symbols is ideally spread across most of the packet. The longer patterns afford more precise frequency estimates and do not allow as much phase drift, but are less resistant to aliasing.

As described in detail in the examples below, the acquisition method begins with the assumption that the symbols within the smallest sub-groups are coherent. When the frequency offset is in fact large, this assumption will lead to reduced performance, and the smallest subgroups are therefore selected to be short in order to provide resistance to large frequency offsets.

A common problem in TDMA is phase noise, in which the phase drifts slowly in a random fashion. In accordance with the method of the invention, the pilot symbols may be used to recover the phase. Thus, the broadest subgroups should be spread across the packet, limiting the widest gap between pilot symbols.

In this example, the coarsest frequency estimate is used to resolve aliasing in the intermediate frequency estimate, while the intermediate frequency estimate is used to resolve aliasing in the finest frequency estimate. To best ensure both these aliasing problems are resolved, the intermediate length-scale should be approximately midway between the shortest groupings and the whole packet. Mathematically, if the shortest sub-patterns have length A, the intermediate patterns have length B, and the whole packet has length C, then the ratios should be similar, $A:B \approx B:C$ There is of course considerable scope within the present invention to select the specific pattern of pilot symbols. Each pattern's frequency response is used to give a final metric, being the ratio between the main beam's power and the highest sidelobes. The exact pattern thus depends on factors including the level of phase noise expected, and the need to balance aliasing problems against the precision of the frequency estimation.

Figure 1:
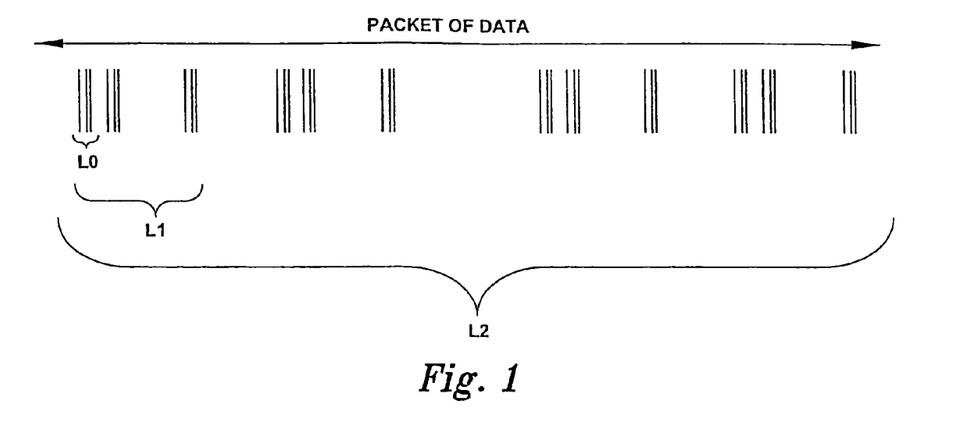
FIG. 1 schematically illustrates the placement of pilot symbols within a data packet in accordance with the invention.

Turning to the drawings, FIG. 1 illustrates placement of pilot symbols within a packet of data. Each line represents a pilot symbol, and these can be seen as structured into groups at different levels (different length-scales). L0 represents a group of pilot symbols, as does L1 and L2. The L2 group includes all the pilot symbols in the packet, including the L1 groups. The L1 group includes the L0 group as shown.

Figure 2:
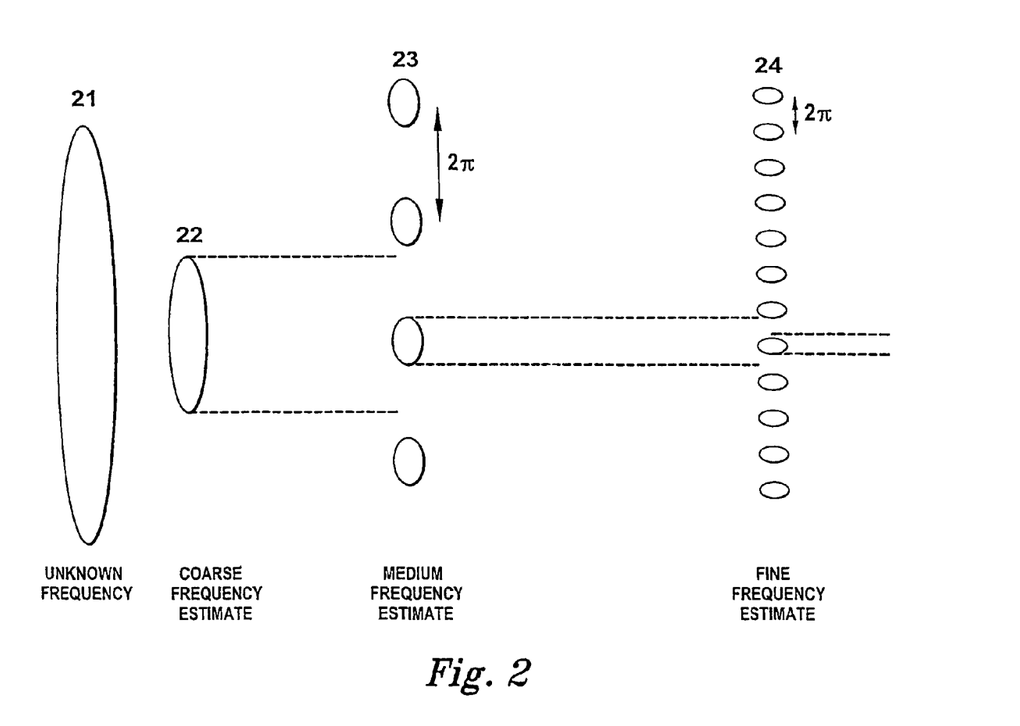
FIG. 2 illustrates the receiver acquisition process of a signal, in accordance with the invention.

FIG. 2 schematically illustrates the receiver acquisition process of a signal with unknown frequency 21. The acquisition process involves, firstly, an approximation of the medium frequency estimate using the L1 group (involving several sub-steps), followed by a coarse frequency estimate using pilot symbols within the same L0 group, followed by a fine frequency estimate using the L2 group. The coarse frequency estimate is referenced in the diagram at 22, the medium frequency estimate using pilot symbols within the L1 group, to resolve the $2\pi$ ambiguities, at 23, and the fine frequency estimate—using coherent summing of all pilot symbols within the L2 group—at 24. The acquisition process is described in further detail below.

Figure 3:
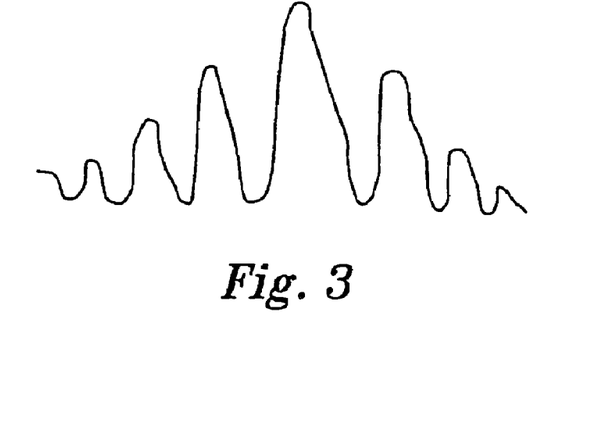
FIG. 3 schematically illustrates the frequency response of a method using two contiguous blocks of pilot symbols, in accordance with the prior art.
Figure 4:
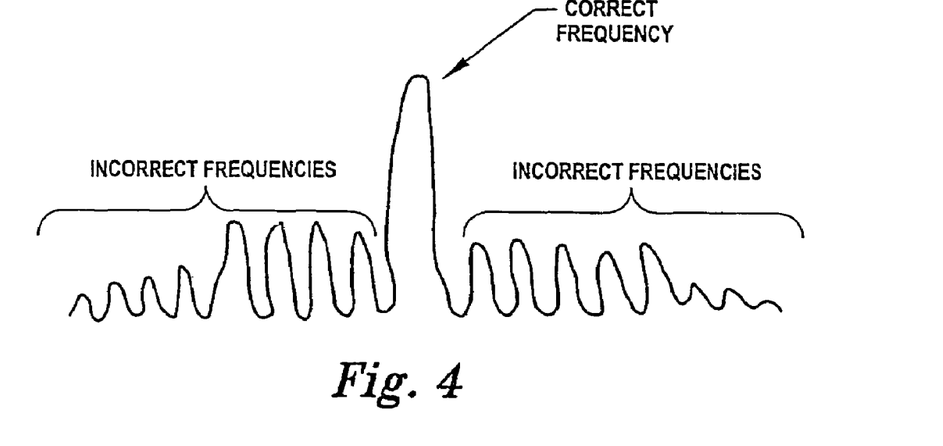
FIG. 4 illustrates the frequency response of a method using the pilot symbol pattern in accordance with the invention.
Figure 5:
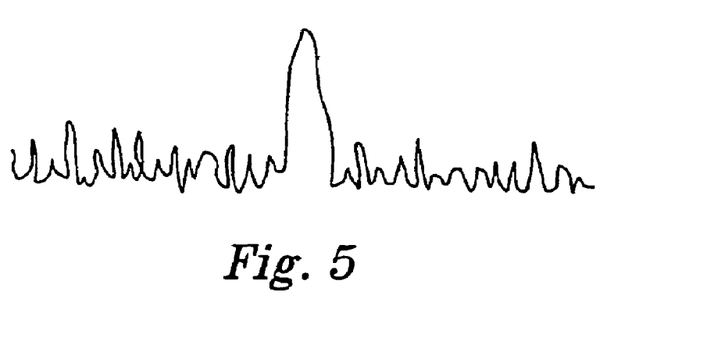
FIG. 5 shows the frequency response of a method using purely randomly spaced pilot symbols.

The frequency response of a pattern of pilot symbols may be defined by forming a vector of numbers, with length equal to the packet length, placing a 1 in each entry that corresponds to a pilot symbol, and a 0 in all other entries, that correspond to data symbols. The frequency response is then the Fourier transform of this vector. In this way, FIG. 3 illustrates the frequency response of two contiguous blocks of pilot symbols (the absolute values of the Fourier coefficients), in accordance with the prior art approach, whilst FIG. 4 illustrates the type of frequency response achievable by the method of the present invention. For comparison, FIG. 5 shows the typical frequency response of a method using purely randomly spaced pilot symbols. This illustrates a strong centre frequency, but at the cost of very high computational load.

The procedure therefore involves three particular levels of frequency estimation. The first provides a coarse frequency estimate with no aliasing. The last provides a precise frequency estimate with much aliasing. The frequency estimate from the intermediate level provides intermediate precision with some (but little) aliasing. Critically, the three phase differences have to be used to calculate three frequency estimates (referred to as the coarse, intermediate and fine frequency) and then combined into a single, unambiguous frequency estimate. Initially, both intermediate and fine frequency estimates have aliasing.

The steps are as follows:
Set the coarse phase difference to zero.
Estimate the intermediate and fine phase differences.
Feed back the intermediate and fine phase differences to re-estimate the coarse phase difference, and hence the coarse frequency.
Re-estimate the intermediate phase difference. Use the coarse frequency to resolve the intermediate frequency aliasing.
Re-estimate the fine phase difference. Use the intermediate frequency estimate to resolve the fine frequency aliasing.

The following section describes this process and steps toward coherent signal acquisition in more detail with reference to the figures. In this section, specific terms are herein defined as:
"TREAT"—to algorithmically summate (add together)
"USE or USING"—to apply determined phase correction factor.

Figure 6:
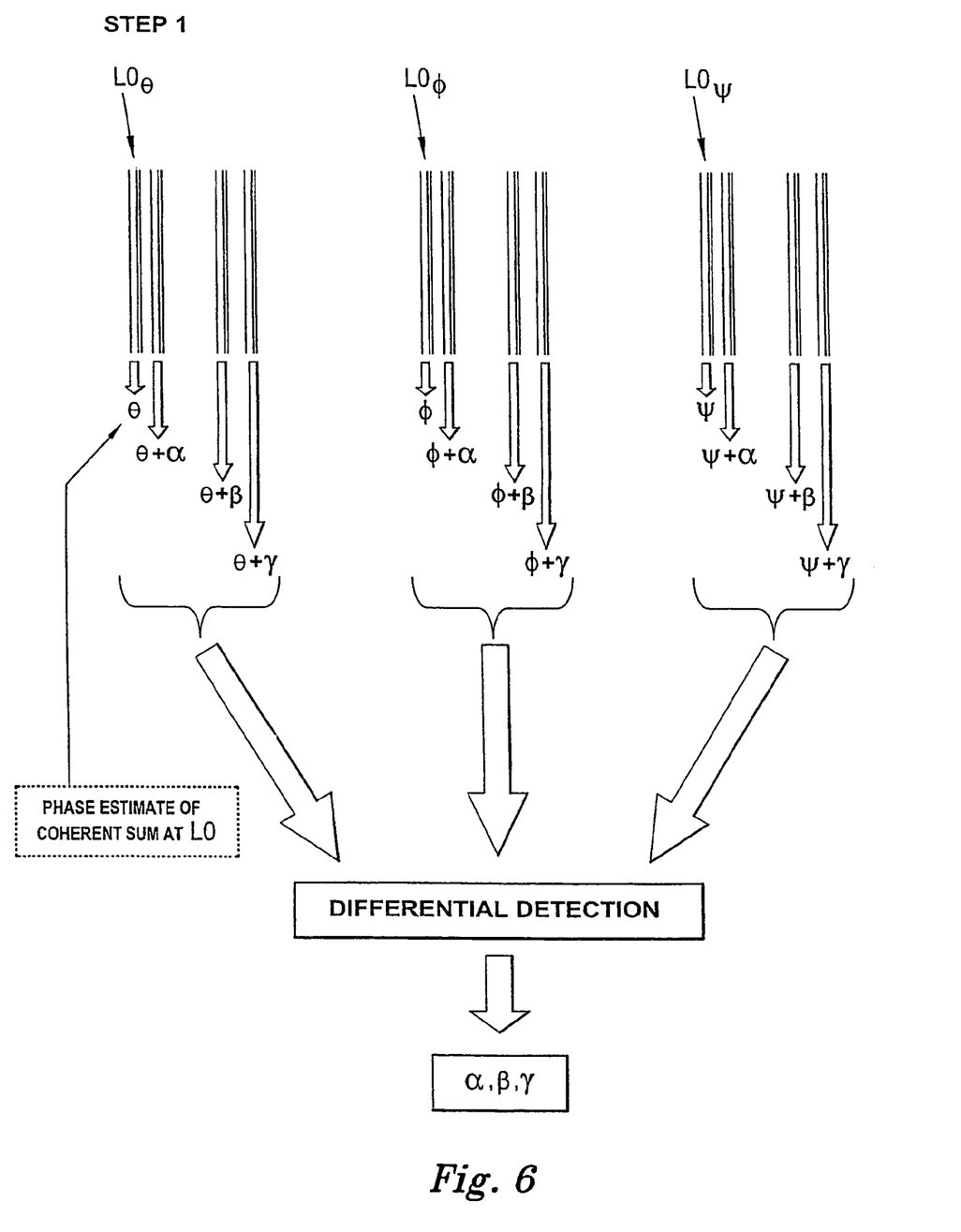
FIGS. 6, 7 and 8 illustrate the different steps of the receiver method of the invention, corresponding to the different functional blocks of the receiver architecture.

STEP 1—as Illustrated in FIG. 6.
TREAT pilot symbols in same L0 as coherent in phase. It is thus assumed at this step that adjacent pilot symbols in an L0 group are mutually in phase, so can be coherently summed to produce the phase estimate, in order to reduce noise.
TREAT pilot symbols in different L1 as independent in phase. Estimate phase differentials at the L1 level.
The result of this step is $\alpha, \beta, \gamma$, the phase differences between L0 groups within each L1 group. It should be noted that this may include $2\pi$ ambiguities, as referred to above.

Figure 7:
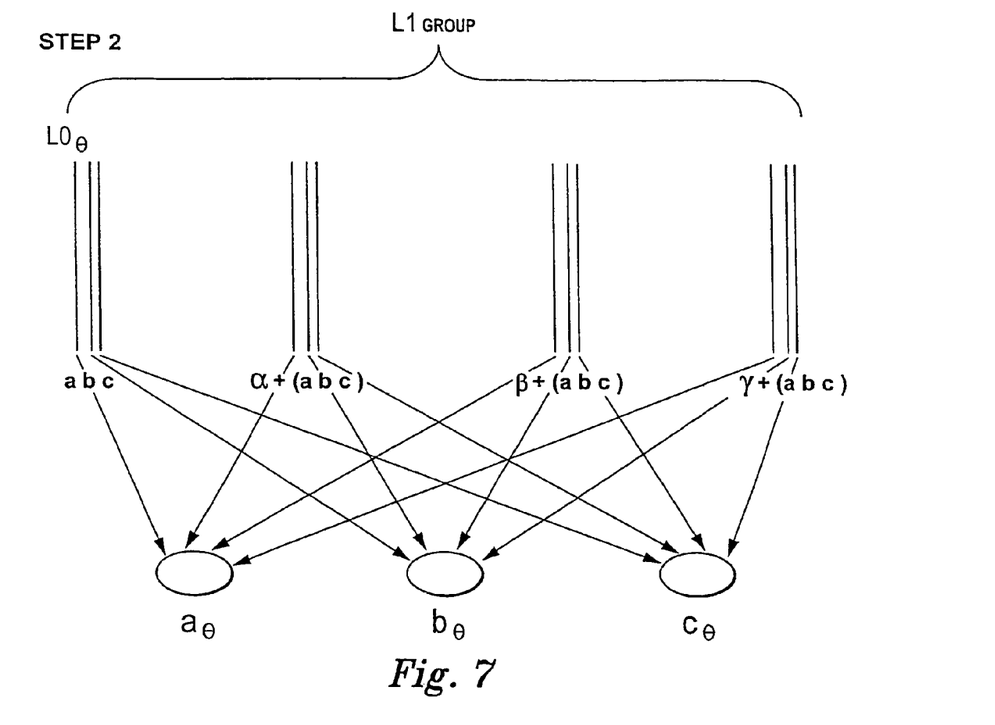

STEP 2—as Illustrated in FIG. 7.
TREAT pilot symbols in each L1 group as coherent in phase USING the results of STEP 1.
TREAT pilot symbols in different L1 groups as independent in phase.
In this way, the method therefore allows coherent combination of the four L0 groups as the $\alpha, \beta, \gamma$ is repeated within the four groups. This combination again reduces the effect of noise, and is of course insensitive to any $2\pi$ ambiguities.
Estimate phase differentials for L0.
USE this to resolve $2\pi$ ambiguities from STEP 1.
Repeat for $\phi$ and $\psi$
The result of this step is phase differences a, b & c, resolving any $2\pi$ ambiguity in $\alpha$, $\beta$, and $\gamma$.

Figure 8:
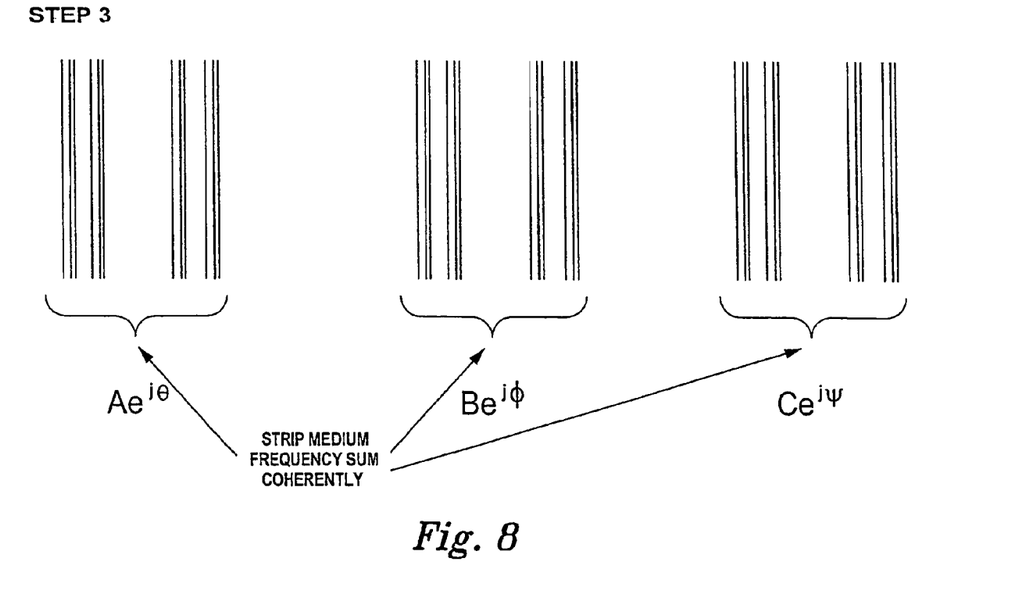

STEP 3—as Illustrated in FIG. 8.
TREAT pilot symbols in the same L1 as coherent in phase USING the results of STEPS 1 and 2.
Estimate phase differentials at the L2 level.
USE the results of STEPS 1 and 2 to resolve $2\pi$ ambiguities to compute frequency.
Use $Ae^{j\Theta}$, $Be^{j\Phi}$, $Ce^{j\Psi}$ to estimate the phase differences between L1 blocks.
These phases can then be used to improve the medium resolution frequency to yield a fine resolution frequency.

STEP 4
Strip the frequency offset found in STEP 3 from all pilot symbols in the packet.
Sum the pilot symbols coherently in order to estimate the signal amplitude of the frequency determined in STEP 3.
If the signal amplitude surpasses a threshold level, strip the fine frequency offset estimate from the data symbols. The data symbols are then output from the acquisition routine.

Figure 9:
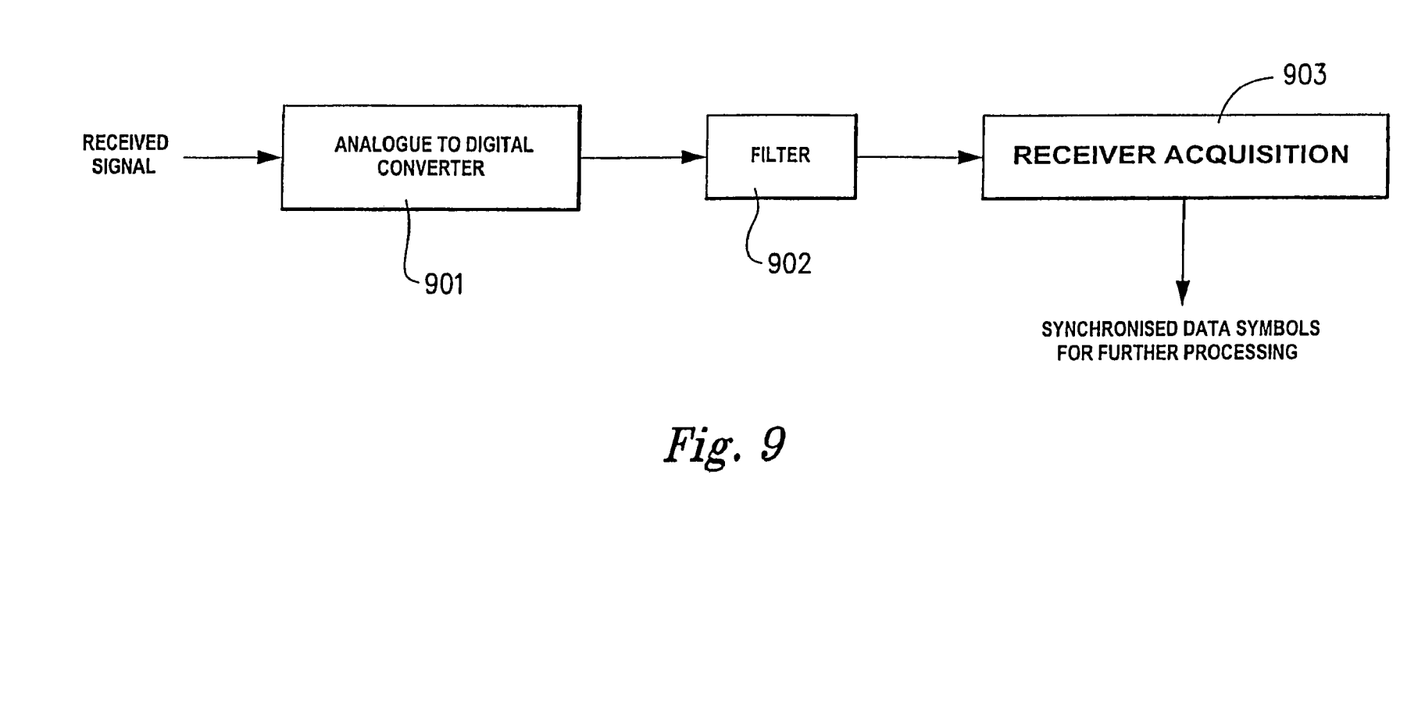
FIG. 9 shows a system block diagram of the receiver components.

A system block diagram is shown in FIG. 9. The received signal is passed through an Analogue Digital Converter 901, then filtered by filter module 902, and passed to receiver acquisition block 903, giving an output synchronised data symbols for further processing.

Figure 10:
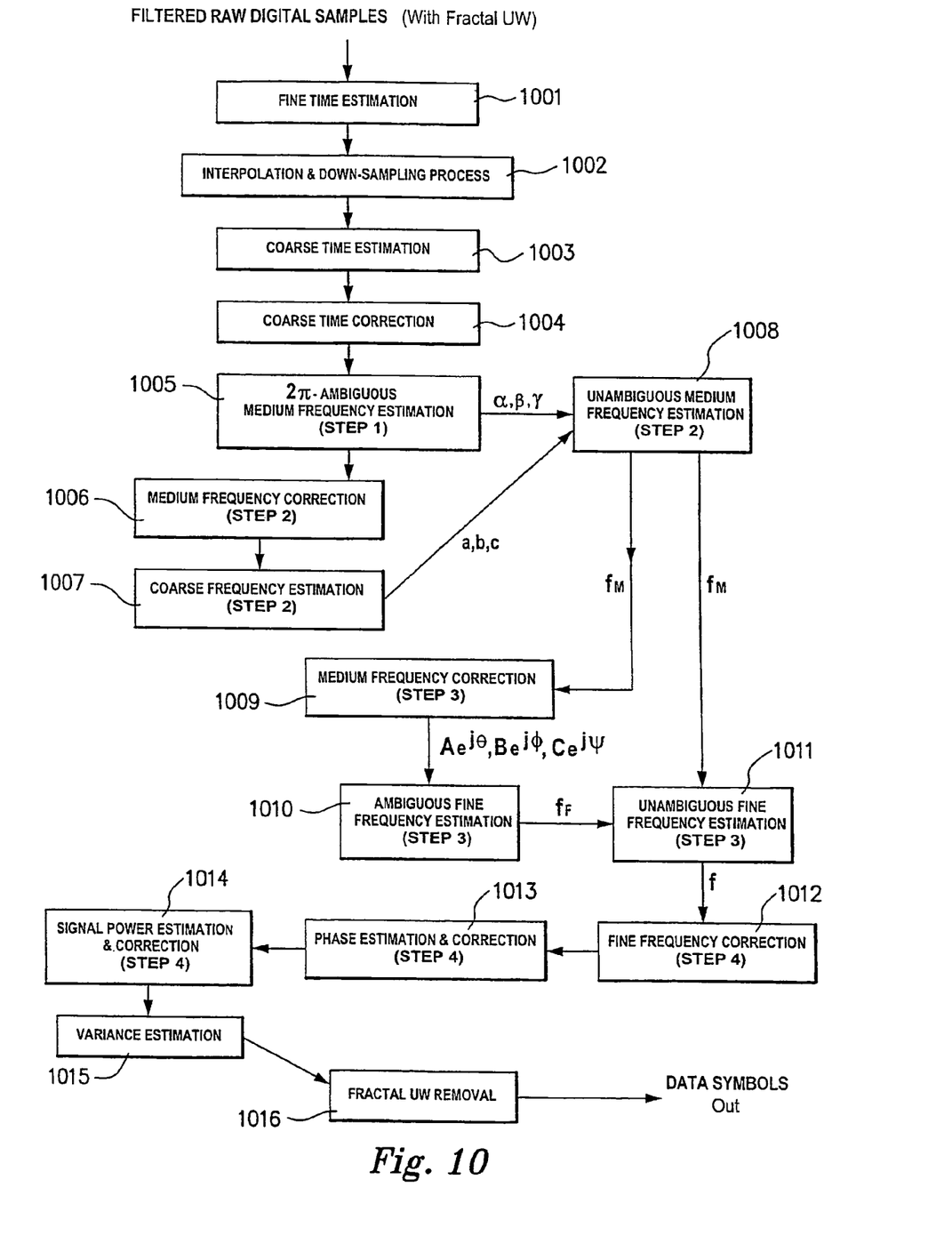
FIG. 10 is a flow chart illustrating the various stages of the method of the invention.

A flow chart outlining the receiver acquisition process according to the preferred embodiment is provided in FIG. 10.

The first step is symbol time estimation. The upsampled data stream is input at functional block 1001. The data is over-sampled, and inter-symbol samples tend to be lower power than on-symbol samples, so the data set is used to estimate the fine time-offset. The output is then used to downsample the packet at functional block 1002, to output the downsampled data stream.

The next step is the coarse time estimation at functional block 1003. The procedure for frequency estimation (see below) is followed for each possible time offset. A likelihood score is found for the most likely frequency at each time offset. The time and frequency with the most likely response is then selected.

The following describes the frequency estimation at a given time offset. At functional block 1004 the samples in the data stream are selected that correspond to pilot symbols, assuming the given time offset is correct, the output being 64 complex numbers. Next, an initial medium frequency estimate is formed at functional block 1005, assuming the coarse frequency offset is zero. This is done by summing symbols within each L0 group, and using differential decoding within each L1 group to find an initial medium frequency estimate. This will be ambiguous, and will be degraded by the poor coarse frequency estimate. The coarse frequency is estimated at functional block 1007, using the initial medium frequency estimate to assist (functional block 1006). The medium frequency estimate is used to coherently sum corresponding pilot symbols from different L0 groups. This helps to measure phase differences within L0 groups, and thus obtain a coarse frequency estimate.

The output is thus the coarse frequency estimate $f_c$, and the medium frequency $f_m$ can now be re-estimated, using the coarse frequency estimate to assist, at functional block 1008. The technique involves firstly using $f_c$ to sum pilot symbols coherently within each L0 group, and the phase differences between L0 groups in each L1 are then used to estimate $f_m$. Then, $f_c$ is used to resolve aliasing in $f_m$.

The next step is the estimation of the fine frequency $f_f$, using $f_c$ and $f_m$ to sum pilot symbols coherently within each L0 and L1 group, at functional block 1009. A fine frequency estimate is then found at functional block 1010 from phase differences between L1 groups. Finally, $f_c$ and $f_m$ are used to resolve aliasing in the fine frequency estimate (functional block 1011) to arrive at an unambiguous fine frequency estimate $f_f$.

The next step is the estimation of signal phase, power and SNR. The fine frequency is stripped from the pilot symbols at functional block 1012. The output of this step is then averaged, the amplitude of the result giving the likelihood score, affording phase estimation and correction (functional block 1013). The square of the amplitude gives the signal power. The phase is recorded, as it needs to be removed from the whole packet. The variance of the stripped pilot symbols estimates the Noise to Signal ratio. These steps are represented by functional blocks 1014 and 1015.

The output is thus the signal phase, power and SNR, for the that coarse time offset.

The final step is to acquire the whole data packet. The coarse time offset is selected that maximises output power, and the symbols that correspond to this time offset are selected from the data stream. The estimated phase, frequency and power are stripped from all these symbols (functional block 1016), and the output is thus the normalised data symbols.

Determine the Fractal Placement of the Pilot Symbols

Clearly, the invention embraces a variety of different pilot symbol distributions across a packet, the actual pattern depending on a number of different factors of relevance. Some factors to be considered in determination of the pattern include:

1. Choose patterns for the groups at each level (L0, L1, L2, . . . ) to minimise the frequency response of the incorrect frequency offset estimates.
2. The fractal pattern selected depends on the overall length of the packet, therefore is scaleable for different packet lengths.
3. The fractal pattern selected depends on the total number of pilot symbols within a packet.
4. The fractal pattern selected depends on the frequency bandwidth under consideration.

All the above requirements give rise to different patterns of pilot symbols chosen and implemented.

Performance Comparison with Prior Art Techniques

The comparison is made in terms of packet error rate performance. As mentioned above, prior art approaches generally use UWs plus pilot symbols to assist in the acquisition and frequency determination of the data stream, and therefore includes an 'overhead' in addition to the real data being transported. The current invention performs 0.5 db-1.0 db better when compared to the prior art using the same number of pilot symbols plus UW overhead. That is to say, for a given number of pilot symbols (only) as overhead, the invention displays superior performance, by 0.5 db-1.0 db.

Implementation Efficiency

The implementation issues include:

Maintaining low manufacturing costs through low cost computational powered digital processing integrated circuits. (i.e. lower priced DSP, microprocessor, FPGA or other related computing integrated circuits.)

Maintaining or improving on the high performance in packet error rate figures

Maximising the effective data rate throughput by maintaining or lowering the 'overhead' data.

The current invention has benefits in producing a data delivery system with reduced manufacturing costs, high performance, and low data overheads.

Application of the System

This invention or system of applying Fractal pilot symbols can be applied to sub-carrier based modulation systems (eg. MCM/OFDM), FDM, WDM, and Single-Carrier TDMA systems.

In addition, the methods described apply to block-based estimators for short-packet sized data streams and sliding-window estimators for long-packet or continuous transmission data streams.

DETAILED EXAMPLE

The following provides a more detailed example of a packet structure:

400 Symbols

36 Pilot Symbols

Frequency offset up to 5 percent of the symbol rate
->Bandwidth F=2*5%=10% of symbol rate The number of levels in the structure depends on the number of pilot symbols. This embodiment employs three levels, but fewer or more levels are possible. This embodiment features three pilot symbols per L0 block, three L0 blocks per L1 block, and four L1 blocks in the full L2 block, giving a total of 36 pilot symbols in the packet. The scale factor (ie the number of Ln blocks per L(n+1) block) at each level should be ideally between 3 and 6, in order to achieve the desired irregularity, and the product of the scale factors equals the total number of pilot symbols allowed.

The acquisition process is better adapted to distinguishing coarse-time (CT) offsets than to distinguish frequency offsets. The CT acquisition performs early stages of the frequency acquisition, repeated for several different time-offsets. Making the early stages faster speeds up the acquisition. An L1 block with few pilot symbols is quicker to compute than one with more pilot symbols, so this embodiment speeds the whole acquisition algorithm by choosing small scale factors for L0 and L1, as mentioned above.

Each L0 block has its Pilot Symbols at positions
(n, n+1, n+3).

Each L1 block has its L0 blocks starting at positions
(m, m+7, m+19).

The L1 blocks start at positions
(k, k+60, k+240, k+360)

Fine Structure

The first step in the algorithm assumes the symbols within each L0 block are coherent. There is a frequency offset of up to 1/20 cycle per symbol, so an L0 block should not cover more than four symbols. The L0 should be as long as possible subject to that restriction, as a longer L0 block will provide a better coarse frequency estimate than a shorter L0 block. For these reasons, the positions (n, n+1,n+3) were chosen for the L0 structure. That is, if an L0 block starts at position n, then symbols at positions n, n+1 and n+3 will be pilot symbols. This will allow the pilot symbols to distinguish between comparatively large frequency offsets.

Medium Structure

The L1 group contains three L0 blocks. The L1 group needs to be sufficiently wide to give a moderately precise frequency estimate, but the L0 blocks need to be sufficiently close, and sufficiently unevenly spaced, so that all wrong frequencies (within the scope of the coarse frequency estimate) provide a weak response when compared with the correct frequency. This embodiment satisfies these requirements by placing the L0 blocks starting at symbols (n, n+7, n+19). This permits the pilot symbols to distinguish between frequencies that are separated by a moderate amount.

Coarse Structure

The full L2 group contains four L1 blocks. The full width of the L2 group needs to cover most of the packet, as a longer L2 allows more precise frequency estimation. The L1 blocks need to be spaced unevenly, in a way that all wrong frequencies (within the scope of the medium frequency estimate) provide a weak response when compared with the correct frequency. This embodiment places the L1 blocks starting at positions n,n+60, n+240 and n+360. The reason for this choice is to have L1 block-pairs separated by 60, 120, 180, 240, 300, and 360 symbols, this range of separations making the pilot symbols pattern effective at distinguishing finely between the possible frequencies.

Metric for Selecting Symbol Pattern

Suppose a pattern of pilot symbols has been chosen. This section describes a suitable method of evaluating the selected pattern, and the operator can then—given the number of pilot symbols and the packet length—evaluate a range of potential fractal patterns.

As a mathematical formalism, we form a vector that represents a packet of data, one entry per symbol. Place a 1 in each entry that represents a pilot symbol, and a zero in the other entries that represent data symbols.

We obtain the frequency response by taking the Fourier Transform of the vector. Restrict this FT to frequencies within a specified Frequency Bandwidth (here F=2×5%=10%) of the zero frequency. The correct frequency offset in this case is zero, and the corresponding Fourier coefficient will present the greatest magnitude. The second-largest Fourier coefficient, within the Frequency Bandwidth F of the zero offset frequency, is the most likely to cause a frequency error. Let R be the ratio between the magnitude of the first and second Fourier Coefficients $R$=abs (Largest Fourier Coefficient)/abs (Second-Largest)

The higher this ratio R, the better the pattern is for acquiring the signal frequency.

The following symbol positions, for example, are chosen to place 36 Pilot Symbols within a 400-symbol packet.
10+[0,1,3,7,8,10,19,20,22, 60,61,63,67,68,70,79,80,82, 240, 241,243,247,248,250,259,260,262, 360,361,363,367,368, 370,379,380,382]

Detailed Analysis of Errors:

The invention uses a substantially fractal pilot symbol distribution. An algorithm for time and frequency acquisition is discussed and analysed below.

Definition of Fractal Pattern:

The pilot symbol pattern includes an irregular collection of samples. Their indices within the packet are $a\_\{ijk\}=iq+pv[j]+w[k]$ for $i=1 \ldots C, j=1 \ldots M, k=1 \ldots F$ There are C*M*F Pilot Symbols (PS) in the packet.

The vectors v and w are irregularly spaced integers. For example,
v=[0,1,5,8,10]
w=[0,1,4,6]
p=9 this might change for 20 ms packet 
q=100

C=6 large groups
M=5 small groups per large group
F 4 PS per small group

The pilot symbols may also include BPSK values.

On a fine scale, the PS's have a pattern given by the vector w. On an intermediate scale, groups of F PS's are arranged in a pattern given by the vector v, on a scale that is p times larger. On a large scale, the groups of F*M PS's are spaced evenly along the packet, to allow the fading to be tracked.

The analysis will also involve the following numbers:

$\sigma^2$=AWGN power/Signal Power $F_2=F(F-1)/2$ $M_2=M(M-1)/2$

Technique:
1. For a given time offset, select the samples that form the pilot symbols. Strip the BPSK symbol values from these samples.
2. Sum all symbols within each smallest group. This will diminish the noise by approximately, 5 dB, depending on the pilot symbol arrangement and on the frequency offset.
3. Use differential decoding to get a medium-resolution frequency estimate with moderate ambiguity problems. In this step, the fine time offset is also estimated.
4. Strip the medium frequency estimate from the pilot symbols. Apply steps similar to 2 and 3 to yield a coarse-resolution frequency with negligible ambiguity problems.
5. Combine the medium and coarse frequency estimates to give an ambiguity-free, medium resolution frequency.
6. Strip this frequency from the pilot symbols. Sum symbols coherently within each medium-sized group. This will further diminish the noise, and allow estimation of a fine frequency offset. Use the medium frequency to resolve the ambiguity in the fine frequency offset estimate.
7. Track the phase and power through the packet using a moving average of the pilot symbols.

Analysis:

There are a number of possible sources of error:

a) Incorrect Fine Time estimate.

b) Inaccurate frequency offset estimation (medium frequency estimate).

c) Inaccurate frequency offset estimation (coarse frequency estimate).

d) Incorrect ambiguity selected after combining medium and coarse frequency offset estimates.

e) Inaccurate frequency estimation (fine frequency estimate).

f) Incorrect ambiguity selected when combining medium and fine frequency offset estimates.

There is also a potential for degradation caused by the initial frequency offset and by intermediate frequency estimation errors.

The variance in frequency will then be estimated on the assumption that none of the above errors occur.

The PS within each small group, and the small groups within each medium group are assumed spaced in a specific irregular manner. The medium groups will be placed evenly within the packet to allow the fading to be tracked.

Clarification of Error Sources:

The incorrect Fine Time alignment estimate is self-explanatory.

When a frequency offset is estimated using a short FFT, the frequency offset may either be off by a small amount, as the local maximum is shifted, or it may be off by a large amount when the wrong Fourier coefficient is chosen. Errors d) and f) are caused by errors of the former type; errors b), c) and e) are errors of the latter type.

The coarse frequency estimate is used to resolve ambiguities in the medium frequency estimate. However, since there is a variance associated with both estimates, there is a possibility that the wrong ambiguity will be chosen, giving errors of type d) and f).

In several time slots, data symbols may present as if they were coherent. Any frequency offset causes a temporary loss in signal to noise ratio and 'permanent' loss in probability of acquisition.

Concrete Formulae:

The formulae used to estimate the fine time and variance are given in this section. Their variances and likelihood of error will be found in the next section.

Let the data stream be $u\_t$, where t is measured in units of the symbol rate. We assume 4 times oversampling, so samples occur at quarter-units.

$s\_\{ijk;t\} = u\_\{qi+pv(j)+w(k)+t\}$ are the pilot symbols when the time-offset is t.

$a\_\{ij;t\} = \text{sum}\_k\, s\_\{ijk;t\}\, R(k)$ $b\_\{ijk;t\} = a\_\{ij;t\}\, a^*\_\{ik;t\}$ $c\_\{j-k;t\} = \text{sum}\_i\, b\_\{ijk;t\}$ $d\_\{j-k;t\} = \text{abs}(c\_\{j-k;t\})^2$ $e\_t = \text{sum}\_j\, d\_\{j;t\}$ $t\_0 = \text{argmax}(e\_t) =: \text{FineTime}$ $S\_\{ijk\} = s\_\{ijk;t\_0\}$ $A\_\{ij\} = a\_\{ij;t\_0\}$ $B\_\{ijk\} = b\_\{ijk;t\_0\}$ $C\_\{j-k\} = c\_\{j-k;t\_0\}$ $\theta = \text{argmax}\, FFT(C\_\{j\})$ MediumFreq=$\theta/2/\pi$*SymbolRate/$p$ (ambiguity SymbolRate/$p$)

Strip the Medium Freq from the UW S, to give S. This forces $S\_\{ijk\}$ to have a phase that is independent of the j value (except for noise).

$D\_\{ik\} = \text{sum}\_j\, S\_\{ijk\}$ $E\_\{ijk\} = D\_\{ij\}\, D^*\_\{ik\}$ $F\_\{j-k\} = \text{sum}\_I\, E\_\{ijk\}$ $\phi = \text{argmax}\, FFT(F\_\{j\})$ CoarseFreq=$\phi/2/\pi$*SymbolRate (ambiguity SymbolRate)

Use CoarseFreq to Resolve the Ambiguity in MediumFreq

Strip the ambiguity correction from the pilot symbols S, to give Š. This forces $\check{S}\_\{ijk\}$ to have a phase that is independent of the j and k values.

$G\_i = \text{sum}\_\{jk\}\, \check{S}\_\{ijk\}$ $\psi = \text{argmax}\, FFT(G\_\{i\})$ FineFreq=$\psi/2/\pi$*SymbolRate/$q$ (ambiguity SymbolRate/$q$)

Use MediumFreq to Resolve the Ambiguity in FineFreq.

The phase and power may now be tracked using a moving average of the PS's, as they are fairly evenly spaced along the packet.

Background Distributions:

Some estimates are needed that are extremely complex to calculate using calculus.

For these purposes, curve-fitting was applied to simple situations in Matlab.

Mean and Variance of the Power of a random Gaussian:

Let $z=1\sigma n$ can be a complex Gaussian random variable, with mean 1 and standard deviation $\sigma^2$. Note that complex random variable, n, is zero mean with unit variance.

Then $\text{MeanPower}(\sigma^2) = \text{mean}(\text{abs}(z^2)) = 1+\sigma^2$ $\text{VarPower}(\sigma^2) = \text{var}(\text{abs}(z^2)) = 2\sigma^2+\sigma^4$ Estimating the maximum power of a set of complex Gaussians:

Let $\{a_n\}$ be a collection of T complex Gaussians with zero mean and unit variance.

Let the maximum power be $x = \max_n \text{abs}(a_n)^2$. Then x is a random real number. By curve-fitting in Matlab, x has mean:

$\text{MeanMaxPower}(T) = 0.575 + \log T + 3/(6T+1)$ and variance:

$\text{VarMaxPower}(T) = 1.65 - 3T/(3T^2+2)$

Loss of Power due to Frequency Offset:

When N pilot symbols with a frequency offset f are summed coherently, the gain in power is $\text{IncoherentPowerLoss}(f) = \text{abs}(\text{mean}\_n\, \exp(jw(n)\, 2\pi f/F_{Sym})^2,$ where w(n) is the position of the nth PS within the packet. This has a maximum value of 1 when the frequency offset f is zero.

Estimating the probability of the attributes of an FFT (variance and location of maximum peak in the spectrum) being correct:

Suppose T terms contribute to an FFT, each of the form $\exp(jn\,\theta)+\sigma m_n$, where $m_n$ are complex Gaussian random numbers with unit variance. The FFT will have T independent coefficients. The correct frequency estimate will give a mean power of $FFT\text{correctMeanPower}(\sigma^2,T) = T^2\, \text{MeanPower}(\sigma^2/T)$ and variance $FFT\text{correctVarPower}(\sigma^2,T) = T^4\, \text{VarPower}(\sigma^2/T)$ The incorrect frequency offset estimates will yield, we assume, T−1 independent random complex numbers with interpolations. Each of the T−1 numbers has mean zero and variance $FFT\text{variance} = T(1+\sigma^2).$ Hence their mean power is $$FFT\text{meanPower}=T(1+\sigma^2)$$

and the variance in their power is $$FFT\text{varPower}=T^2(1+\sigma^2)^2.$$

The strongest of the incorrect frequencies will have power of mean $$FFT\text{meanMaxPower}=FFT\text{meanPower}+FFT\text{variance}*\text{MeanMaxPower}(T)$$

and variance $$FFT\text{varMaxPower}=FFT\text{meanPower}^2*\text{VarMaxPower}(T).$$

Therefore the correct frequency will be chosen, and θ will be roughly correct, with a safety margin of this many standard deviations:

$$FFT\text{correctSD}(T,\sigma^2)=(FFT\text{correctMeanPower}-FFT\text{meanMaxPower})/\text{sqrt}(FFT\text{correctVarPower}+FFT\text{varMaxPower})$$

Estimating the variance of an estimated frequency:
The variance of f, assuming the correct option emerges from the FFT, is:

$$FFT\text{freqVar}(T,\sigma^2)=F_{Sym}{}^2\sigma^2/(6T^3)$$

Estimation of Variance, and Error Probabilities:
Suppose the data has unit power and the AWGN has power $\sigma^2$.

We require the distribution of the estimate for the correct time offset, and also for the incorrect time offsets. The notation A~N(B,C) is used, to mean that A is a random variable with mean B and variance C. This is not necessarily Gaussian, although a Gaussian distribution is assumed for this analysis. It will normally be clear from the context whether a number is real or complex.

Estimation of Error Probability in Fine Time
At the correct fine time estimate, with the correct pilot symbol structure, the variables will have the following distributions.
$S\_\{ijk\}\sim N(1,\sigma^2)$
$A\_\{ij\}\sim N(F,F\sigma^2)$ % with power loss
$B\_\{ijk\}\sim N(F^2;2F^3\sigma^2+CF^2\sigma^4)$
$C\_j\sim N(CF^2,2CF^3\sigma^2+CF^2\sigma^4)$
$D\_j\sim N(C^2F^2+2CF^3\sigma^2+CF^2\sigma^4,$
$E\sim N(M_2(C^2F^2+2CF^3\sigma^2+CF^2\sigma^4),$
At the wrong times, or with the wrong pilot symbol structure, the data and AWGN are indistinguishable.
$S\_\{ijk;t\}\sim N(0,1+\sigma^2)$
$A\_\{ij;t\}\sim N(0,F(1+\sigma^2))$
$B\_\{ijk;t\}\sim N(0, F^2(1+\sigma^2)^2)$
$C\_\{j;t\}\sim N(0, CF^2(1+\sigma^2)^2)$
$D\_\{j;t\}\sim N(CF^2 (1+\sigma^2)^2,$
$E\_t\sim N(M_2 CF^2 (1+\sigma^2)^2,$
Max $E\sim N(+(\log T+0.57), 1.65*)$ Thus we might estimate the probability of error in terms of standard deviations:

$$(M1-m2)/\text{sqrt}(v1+v2)$$

The medium frequency offset is now stripped from the packet. Consider one medium group of PS, which contains M fine groups of F PS each. The first PS in each fine group should now be in phase, and can be added together coherently. The same applies to the second in each group, and so on. It is therefore possible to use a similar procedure for finding the coarse frequency estimate as described above to find the medium frequency estimate. Although the variance of the coarse estimate is greater, its ambiguity is much greater again, and this can be used to correct the ambiguity in the medium frequency.

The probability of choosing the incorrect ambiguity depends on the variance of the Coarse and Medium Frequency estimates.

Correct the estimate for the adjusted Medium Frequency. Now all the PS within each medium group may be summed coherently. Each medium group yields a single value with quite low noise, of mean value MF and variance $MF\sigma^2$. These are spread evenly over the packet, and may be used to estimate the frequency with very low variance.

The ambiguity in this estimate is the Symbol Rate divided by the spacing between medium groups. The adjusted medium frequency is used to resolve the ambiguity in the Fine Frequency.

The inventor of the present invention has carried out performance comparison between use of a pilot symbol distribution in accordance with the invention and use of a comparable distribution in accordance with the patterns proposed in the Lo, Lee and Gansman IEEE paper referenced above, specifically patterns M01, M02 and M013 shown in FIG. 1 of that paper. These arrangements add three pilot symbols to the purely uniform pattern U10. It is to be noted that pattern M03 has the disadvantage, as demonstrated in FIG. 5 of the paper, that it cannot correct Doppler shifts beyond a certain limit, due to aliasing problems. In contrast, the fractal pattern is devised to be able to handle Doppler shifts using sparse pilot symbols. In order to carry out a like-for-like comparison, patterns were simulated based on M01, M02 and M03 by pattern repetition, to form packets with around 70 pilot symbols in a packet length or approximately 500 symbols. These could then be compared with the performance of a fractal pattern of 500 symbols including 64 pilot symbols. Fading was added with a frequency bandwidth equal to 40% of the packet frequency. Fading causes power changes within each packet, although the power change caused by fading is 0 dB when averaged over the whole packet.

The results of this comparison, in various noise levels, were that the best pattern (in terms of probability of acquisition in a Doppler frequency offset) is the fractal pattern. In addition, the fractal patterns used included fewer pilot symbols than the other patterns analysed (64, as compared with 70).

The examples described above and in the accompanying figures are directed to fractal patterns having three levels or length scales, and acquisition algorithms designed to acquire signals containing such pilot symbol arrangements. As noted above, patterns over other numbers of length scales are possible. For example, for smaller data packets with fewer pilot symbols, two-level fractal patterns may be more appropriate. This can give better sidelobe reduction, but needs more computation than a three-level method for the same number of pilot symbols.

For a two-level fractal pattern (ie, containing a plurality of L0 groups within an L1 group spanning the packet length), the acquisition algorithm does not require an intermediate frequency estimate. The acquisition steps are therefore:

a) A fine frequency estimation step, assuming the coarse frequency offset is zero;
b) A coarse frequency estimation step based on the result of step a);
c) A fine frequency re-estimation step based on the result of step b); and
d) An adjustment to the fine frequency estimation to resolve 2π ambiguities in the fine frequency estimation.

A further alternative embodiment of the present invention involves replacing one or more pilot symbols of the fractal pattern with data symbols, to provide a 'punctured' fractal pilot symbol pattern, and then applying the acquisition process of the invention, making the assumption that these pilot symbols have zero value. This can increase the efficiency in terms of rate of data transmission, particularly in situations of high SNR. In this variant, then, the pilot symbol pattern is not strictly fractal, but the acquisition technique designed for fractal structures—albeit with minor adjustment—can be employed.

Reference is made above to the known so-called 'Turbo-Synch' technique in TDMA. Such a technique might also be combined with the acquisition method of the present invention, to provide further improvement to the reliability. In this method, the data is encoded with forward error correcting codes such as turbo codes, before insertion into the data stream. In application, the steps of such a method involve:

embedding further pilot bits within the data before transmission;

encoding the result with forward error correcting codes;

in the receiver, acquiring a list of the few most likely time and frequency offset pairs, ranked in order of likelihood; and for each time and frequency offset pair in the list, starting with the most likely, and proceeding in their order of likelihood, decoding the packet based on the assumption of that time and frequency offset;

if enough of the embedded pilot bits match their prescribed values, accepting that time and frequency offset; and otherwise continuing until the embedded pilot bits are found to match their prescribed values or until the list is exhausted.

The functional steps of the method of the invention can be implemented on a digital signal processing chip, or with software on a suitable computer apparatus.

It is to be understood that the above description of preferred embodiments of the present invention is not limitative of the scope of the invention, as variations and additions are possible without departing from the spirit of the invention.

The invention claimed is:

1. A method of placing pilot symbols in a data stream for telecommunications systems, the data stream including a data packet, comprising:

placing the pilot symbols with irregular spacing within a first level group;

repeating the irregular spacing in a plurality of such first level groups;

placing the first level groups with irregular spacing within a second level group; and wherein the pilot symbols are distributed within the data stream in time in a manner fractal in nature using a range of different intervals between the pilot symbols.

2. The method of claim 1, wherein the distributing further includes:

repeating the irregular spacing between the first level groups in a plurality of second level groups across the data packet; and placing the second level groups with irregular spacing within a third level group.

3. The method of claim 2, wherein each first level group has length A, each second level group has length B, and the third level group has length C, the pilot symbol distribution selected such that the ratio A:B is approximately equal to the ratio B:C.

4. The method of claim 1, wherein the pilot symbols extend across the entirety of the data packet.

5. A signal processing device for use in a communications system, the signal processing device comprising:

a data source configured to generate a data stream for telecommunications systems; and a pilot symbol placer configured to place pilot symbols in the data stream in accordance with the method of claim 1.

6. A method for receiving and acquiring a transmitted signal in a communications system, the signal representing a data stream including data symbols and pilot symbols, the method comprising:

receiving the transmitted signal and converting to a digital signal; and acquiring by iteration the frequency of the signal by:

calculating a first estimate of phase and signal amplitude based on an assumed zero phase difference between certain closely spaced pilot symbols within the data stream;

calculating a fine frequency estimate with aliasing ambiguity based on more widely spaced pilot symbols within the data stream;

using said fine frequency estimate to calculate a phase difference between said closely spaced pilot symbols, and calculating a coarse frequency estimate based on this phase difference, with no aliasing ambiguity;

using the calculated coarse frequency estimate to enhance the fine frequency estimate by refining said calculated phase and signal amplitude, and thus re-calculating said fine frequency estimate;

using said coarse frequency estimate and the enhanced fine frequency estimate to resolve the aliasing ambiguity in the fine frequency estimate; and applying the enhanced fine frequency estimate to the data stream in the acquisition of the data symbols.

7. A method for receiving and acquiring a transmitted signal in a communications system, the signal representing a data stream including data symbols and pilot symbols, the method comprising:

receiving the transmitted signal and converting to a digital signal; and acquiring the frequency of the signal by:

a) a medium frequency estimation;

b) a coarse frequency estimation based on the result of (a);

c) a medium frequency re-estimation based on the result of (b);

d) an adjustment to the medium frequency estimation to resolve aliasing ambiguities in the medium frequency estimation;

e) a fine frequency estimation, including a calculation of a likelihood for the selected frequency; and f) an adjustment to the fine frequency estimation to resolve aliasing ambiguities in the fine frequency estimation.

8. The method of claim 7, further comprising:

g) phase and signal estimation and correction based on the result of (f).

9. The method of claim 8, further comprising:

h) removing the pilot symbol from the data stream to provide a data symbol output.

10. The method of claim 8, further comprising:

estimating variance.

11. The method of claim 10, wherein the reliability of the acquiring is improved by using additional encoded pilot symbols embedded within the data stream, the additional pilot symbols encoded with forward error correcting codes, the method further comprising:

acquiring a list of the most probable time and frequency offset pairs ranked in order of probability;

starting with the highest probability, and proceeding in order of decreasing probability for each said time and frequency offset pair in the list:

decoding the packet on the basis of the time and frequency offset;

accepting the time and frequency offset if a predetermined number of said additional encoded pilot symbols match their prescribed values; and continuing to the next time and frequency offset pair in the list if the predetermined number of said additional encoded symbols do not match their prescribed values.

12. The method of claim 11, wherein the pilot symbols are spaced in time using a range of different intervals between symbols.

13. The method of claim 12, enhanced for greater data transmission efficiency, wherein one or more of the pilot symbols in the selected data stream are replaced with data symbols, and the acquiring the frequency of the signal is based on the assumption that these selected symbols are pilot symbols with zero value.

14. A receiver for receiving and acquiring transmitted signals in a communications system, the signals representing a data stream including data symbols and pilot symbols, the receiver comprising:

a functional block for receiving the transmitted signal and converting to a digital signal; and a functional block for iteratively acquiring the frequency of the signal, including:

a functional block for calculating a first estimate of phase and signal amplitude based on an assumed zero phase difference between certain closely spaced pilot symbols within the data stream;

a functional block for calculating a fine frequency estimate with aliasing ambiguity, based on more widely spaced pilot symbols within the data streams;

a functional block for using said fine frequency estimate to calculate a phase difference between said closely spaced pilot symbols, and calculating a coarse frequency estimate based on this phase difference, with no aliasing ambiguity;

a functional block for using the calculated coarse frequency estimate to enhance the fine frequency estimate by refining said calculated phase and signal amplitude, and thus re-calculating said fine frequency estimate;

a functional block for using said coarse frequency estimate and the enhanced fine frequency estimate to resolve aliasing ambiguity in the fine frequency estimate; and a functional block for applying the enhanced fine frequency estimate to the data stream in the acquisition of the data symbols.

15. A receiver for receiving and acquiring transmitted signals in a communications system, the signals representing a data stream including data symbols and pilot symbols, the receiver comprising:

a functional block for receiving the transmitted signal and converting to a digital signal; and a functional block for acquiring the frequency of the signal, including:

a) a functional block for carrying out a medium frequency estimation-step;

b) a functional block for carrying out a coarse frequency estimation step based on the result of (a);

c) a functional block for carrying out a medium frequency re-estimation step based on the result of (b);

d) a functional block for carrying out an adjustment to the medium frequency estimation to resolve aliasing ambiguities in the medium frequency estimation;

e) a functional block for carrying out a fine frequency estimation, including a calculation of a likelihood for the selected frequency;

f) a functional block for carrying out an adjustment to the fine frequency estimation to resolve aliasing ambiguities in the fine frequency estimation.

* * * * *